United States Patent
Hiyokawa et al.

[11] Patent Number: 5,825,306
[45] Date of Patent: Oct. 20, 1998

[54] NAVIGATION SYSTEM FOR VEHICLES

[75] Inventors: Toyoji Hiyokawa; Mitsuhiro Nimura; Yasunobu Ito, all of Anjo, Japan

[73] Assignee: Aisin Aw Co., Ltd., Anjo, Japan

[21] Appl. No.: 701,704

[22] Filed: Aug. 22, 1996

[30] Foreign Application Priority Data

Aug. 25, 1995 [JP] Japan ................................. 7-217864
Sep. 29, 1995 [JP] Japan ................................. 7-253368

[51] Int. Cl.⁶ ................................................. G08G 1/123
[52] U.S. Cl. .......................... 340/988; 340/995; 701/209
[58] Field of Search .................................. 340/995, 988, 340/990, 825.19; 341/23, 26; 364/449.2, 449.3, 449.5; 395/796

[56] References Cited

U.S. PATENT DOCUMENTS

| | | | |
|---|---|---|---|
| 4,339,806 | 7/1982 | Yoshida | 395/796 |
| 4,438,505 | 3/1984 | Yanagiuchi et al. | 395/796 |
| 4,459,049 | 7/1984 | Howell et al. | 400/98 |
| 5,059,965 | 10/1991 | Geiser | 340/995 |
| 5,072,395 | 12/1991 | Bliss et al. . | |
| 5,261,091 | 11/1993 | Yugama | 395/796 |
| 5,262,948 | 11/1993 | Kato | 395/796 |
| 5,471,392 | 11/1995 | Yamashita | 340/995 |
| 5,635,953 | 6/1997 | Hayami et al. | 340/995 |

FOREIGN PATENT DOCUMENTS

| | | |
|---|---|---|
| 0 633 452 A1 | 1/1995 | European Pat. Off. . |
| 7-55492 | 3/1995 | Japan . |
| WO 88/08119 | 10/1988 | WIPO . |
| 95/04340 | 2/1995 | WIPO . |

*Primary Examiner*—Brent A. Swarthout
*Attorney, Agent, or Firm*—Oliff & Berridge, PLC

[57] ABSTRACT

According to the invention, when a target name is inputted using characters such as alphabet and numerics, strings of characters or numerics are compared with data of registered places each time one character is inputted, names of registered places including the inputted string of characters or numerics is listed, and the number of registered target names remaining on the list is displayed.

When the target name is inputted in characters, the inputted data is compared with a list of the registered names having word components arranged in different orders with respect to a single official name by a forward match comparison, and the number of registered target names remaining on the list with forward match is displayed.

When the number of the inputted characters or numerics increases and the number of registered target names remaining on the list decreases, a list of the registered place names is displayed. The target name is selected from this list. When the number registered target names remaining on the list is one, the target name is selected. A map of the vicinity of the target name thus selected is displayed.

13 Claims, 15 Drawing Sheets

FIG. 3

Alphabetical input screen

| A B | | | | | | | |
|---|---|---|---|---|---|---|---|
| A | B | C | D | E | F | G | H | I |
| J | K | L | M | N | O | P | Q | R |
| S | T | U | V | W | X | Y | Z | 0 |
| 1 | 2 | 3 | 4 | 5 | 6 | 7 | 8 | 9 |
| LIST | BS | CL | No. of remaining 1234 target names in list | | | | |

LIST ↓    ↑ RETURN

No. of remaining 1234 target names in list

| A | ABBDEFG |
|---|---|
|   | ABEEFG |
|   | ABHKL |
|   | ABJONN |
|   | ABMZX |

ENTER ↓    ↑ RETURN

MAP DISPLAY

FIG. 4

| 1st character | Registered place name |
|---|---|
| ⋮ | ⋮ |
| B | |
| | BADAPOZ |
| | BADANAH |
| | BAIKAL |
| | BAQUBAH |
| | BARCELONA |
| | BARSTOW |
| | BASEL |
| | BASTAK |
| | BASILAN |
| | BATH |
| | BATHURST |
| | BAYERN |
| | ⋮ |
| | BEITBRIDGE |
| | BELFAST |
| | BERLIN |
| | BERN |
| | BERGEN |
| | BERKLEY |
| ⋮ | ⋮ |

FIG. 7(a)

Index data

| No. of categories (n) | |
|---|---|
| 1 | Category name |
| | Place data address and size |
| | ⋮ |
| n | |

FIG. 7(b)

Category-classified place data

| No. of place data (m) | |
|---|---|
| 1 | Place data name |
| | Pronunciation of place data name |
| | East longitude and north latitude |
| | Map display scale |
| | Registered place No. |
| | ⋮ |
| m | |

FIG. 8

Alphabetical input screen

| HOTEL | | | | | | | | |
|---|---|---|---|---|---|---|---|---|
| A | B | C | D | E | F | G | H | I |
| J | K | L | M | N | O | P | Q | R |
| S | T | U | V | W | X | Y | Z | 0 |
| 1 | 2 | 3 | 4 | 5 | 6 | 7 | 8 | 9 |
| LIST | BS | CL | SP | No. of remaining names  123 | | | | |

LIST ↓           ↑ RETURN

No. of remaining names  123

| D  D HOTEL |
|---|
| E  E HOTEL |
| G  G HOTEL |
| H  HOTEL D |
| HOTEL E |

ENTER ↓           ↑ RETURN

MAP DISPLAY

FIG. 9

| 1st character | Registered place name |
|---|---|
| A | A BANK |
| ⋮ | A HOTEL |
| ⋮ | A STATION |
| ⋮ | ⋮ |
| B | BANK AA |
| ⋮ | B BANK |
| ⋮ | B HOTEL |
| ⋮ | B STATION |
| ⋮ | ⋮ |
| H | HOTEL D |
| ⋮ | HOTEL E |
| ⋮ | ⋮ |

FIG. 11

Set the destination

| fu | ji | | | | | | | | |

| a | ka | sa | ta | na | ha | ma | ya | ra | wa | n |
|---|---|---|---|---|---|---|---|---|---|---|
| i | ki | shi | chi | ni | hi | mi | | ri | | `` |
| u | ku | su | tsu | nu | fu | mu | yu | ru | | ° |
| e | ke | se | te | ne | he | me | | re | | |
| o | ko | so | to | no | ho | mo | yo | ro | wo | |

No. of remaining names 1950  BS CL LIST

LIST ↓     ↑ RETURN

No. of remaining names  1950

| fu | Fuji Insatsu |
| | Fuji Uindow |
| | Fuji Kontact |
| | Fuji Konputer |
| | Fuji Kougyou |

ENTER ↓     ↑ RETURN

MAP DISPLAY

| User announcement | Proper name | Position and information |
|---|---|---|
| a・・・ | | |
| ・ | | |
| ・ | | |
| ko・・ | | |
| ・ | | |
| Kokugikan Ryogoku | Ryogoku Kokugikan | |
| ・ | | |
| Disneyland Tokyo | Tokyo Disneyland | |
| ・ | | |
| Tokyo Disneyland | Tokyo Disneyland | |
| ・ | | |
| Ryogoku Kokugikan | Ryogoku Kokugikan | |
| ・ | | |
| n | | |

NAVIGATION SYSTEM FOR VEHICLES

BACKGROUND OF THE INVENTION

1. Field of the Invention

The invention relates to a navigation system for vehicles, by which an optimal route from a present position of a vehicle to a destination is searched by inputting data regarding the destination such as place of destination, transit point, and facilities.

2. Description of the Related Art

A vehicular navigation system mounted on an automobile and used for providing route guidance is already known, in which names of points or targets such as an destination, transit points, facilities to be visited are alphabetically inputted (See JP-A-2-503045). In this system, when a target name "PARIS", is to be inputted, for example, the first character position is selected then the character string is scrolled at this position. First, the character or the letter "P" is selected and inputted, and then the second character position is selected, and by scrolling the character string at this position, the character "A" is selected and inputted. Thereafter, by sequentially Inputting the characters to the last in the same manner, the target name is alphabetically inputted.

In the conventional type navigation system, in which the target name is alphabetically inputted, it is necessary to input the alphabetical characters of the target name to the last character. Because the target names to be inputted are the names often unfamiliar to the user, it takes much time to input the names alphabetically to the last character, and this causes much inconvenience to the user.

A type of navigation system is known in the prior art, in which the target names are inputted as they are pronounced, and the place name is searched (See JP-A-7-55492). In this type of system, registered place names having common portions or common name components such as "Nagoya Station" and "Shin-Nagoya Station" are stored in data in advance. When the common portion having the same pronunciation is inputted, the data of all registered place names having the common portion are listed up. The place names are searched by forward match comparison, and the searched place names are displayed in a list.

In this method, however, the place names are simply searched by forward match comparison and are listed in display. If there are many names in the displayed list, it may take some time to find out the aimed registered place name among others.

Also, it has been customary in the past that a destination target name cannot be inputted unless it is an official name. For example, if the word "Disneyland" is inputted instead of the official name of "Tokyo Disneyland" or the word "Kokugikan" is inputted instead of the official name or "Ryogoku Kokuglkan", the target name cannot be searched.

SUMMARY OF THE INVENTION

It is an object of the invention to provide a navigation system, by which it is possible to save time and labor in inputting target names.

It is another object of the invention to provide a navigation system, by which it is possible to more conveniently use the navigation system.

To attain the above objects, the navigation system for providing route guidance by inputting a target name and by searching an optimal route from a present position or a starting point of a vehicle according to the invention comprises an input means for inputting target names such as destination, transit points and facilitates to be visited in alphabetical characters and numerics, a memory means for storing target names at least as registered place data, a searching means for comparing characters or numeric strings inputted with registered target name place data each time one character of the target name is inputted and for searching registered target name place data including the inputted character or numeric strings, a display means for displaying a number in the list of the searched target names, a list of target names and maps, and a selection means for selecting the target name when the number of registered target names remaining is one or for selecting the aimed target name from the displayed target name list.

It is also an object of the invention to provide a navigation system for providing route guidance by inputting a target name and by searching an optimal route from a present position or a starting point of a vehicle according to the invention which comprises an input means for inputting target names such as destination, transit points and facilities to be visited in alphabetical characters and numerics, a memory means for storing a list of registered names having two or more sequences of word components with respect to at least one official name, a searching means for searching the target name by comparing the list of names stored in said memory means with the inputted data by forward match comparison each time one character of the target name inputted by said input means is inputted, a display means for displaying a number of target names in the list of the target names found by forward match in searching, a list of target names and maps, and a selection means for selecting the target name when the number of target names remaining is one or for selecting the aimed target name from the displayed list of target names.

BRIEF DESCRIPTION OF THE DRAWINGS

FIG. 3 is a drawing for explaining an alphabetical input screen;

FIG. 4 shows a data structure;

FIGS. 7(a)–(b) shows an example of a data file of registered places;

FIG. 8 is a drawing for explaining alphabetical input screen;

FIG. 9 shows a data structure;

FIG. 11 is a drawing of an input screen;

DETAILED DESCRIPTION OF PREFERRED EMBODIMENTS

Figure 1:
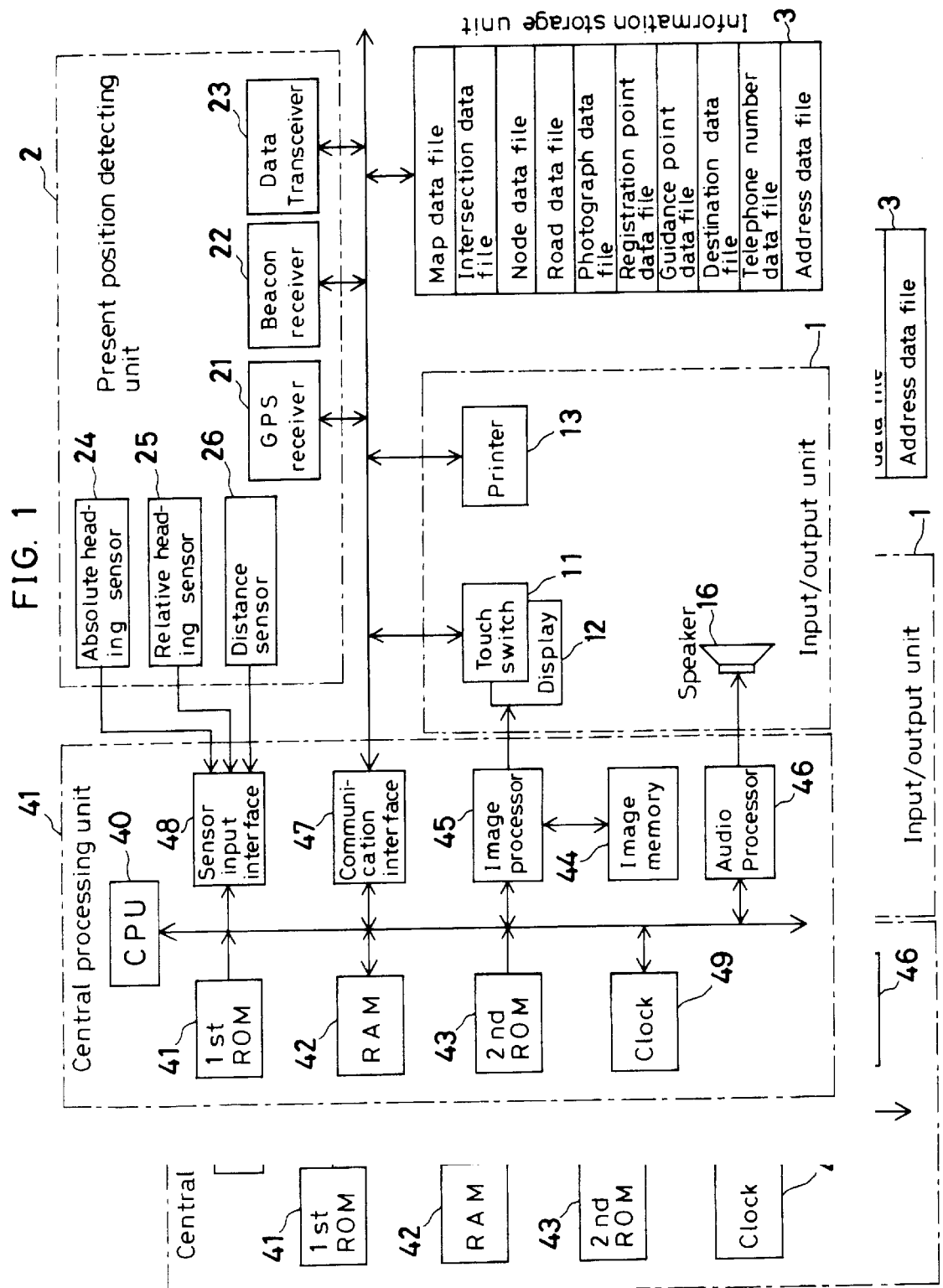
FIG. 1 is a block diagram showing an arrangement of an example of a navigation system according to the present invention.

FIG. 1 shows an arrangement of an example of a navigation system according to the invention. The navigation system according to the invention comprises, an input/output unit 1 for inputting and outputting information relating to route guidance, a present position detecting unit 2 for detecting information relating to the present position of a vehicle, an information storage unit 3 for storing: (i) navigation data necessary for calculation of an optimal route, (ii) display guidance data necessary for calculation of an optimal route, and (iii) display guidance data necessary for guidance, and a central processing unit 4 for performing route search processing or display guidance processing necessary for route guidance and for controlling the entire system.

The input/output unit 1 is provided with functions to input a destination, to instruct the central processing unit 4 to carry out navigation processing at the request of the driver so that guidance information can be inputted in voice and/or on screen when the driver needs such information, and to print out the data after the processing. As the means to fulfill the above functions, the input unit is provided with a touch switch 11 or an operation switch to input the destination data using telephone number or coordinates on a map or to request the route guidance. The output unit is provided with a display unit 12 for displaying inputted data on screen or for displaying route guidance automatically on screen at the request of the driver, a printer 13 for printing out the data processed by the central processing unit 4 and the data stored in the information storage unit 3, and a speaker 16 for outputting route guidance in voice.

In the case of voice activation, it is possible to add a voice recognizer used for recognizing an inputted voice and a card reader for reading data recorded on an IC card or magnetic card. Also, it is possible to add a data communication unit, which is used to send data to or receive from an information center where data necessary for navigation is stored, or send data to or from an information source such as an electronic notebook where the data specific to the driver such as map data and destination data are stored. In the latter case, the data is supplied via communication line at the request of the driver.

The display unit 12 comprises a color CRT or a color liquid crystal display and displays and outputs all screens necessary for navigation such as target name input screen, route setting screen, sector view screen and intersection view screen. The outputs are based on map data and guidance data processed by the central processing unit 4. Additionally functional buttons for: (i) setting a desired route, (ii) switching over guidance (voice and visual control or visual only), (iii) setting screen characteristics are presented on the display unit 12. In particular, transit intersection information such as transit interaction name is given in pop up color display on the sector view screen as necessary. On the target name input screen, the number of the remaining lists of all target names having a common portion with the same pronunciation and the selection screen of target names are displayed so that, when the target name is selected by manual selection or by remote control operation, a map of the vicinity of the destination is displayed.

This display unit 12 is installed on an instrument panel near the driver's seat. By watching the sector view, the driver can confirm the present position of the vehicle and can obtain information on the route ahead. Additionally, the display unit 12 may function as a touch screen which designates functional buttons in the display which can be touched by the user. By touching the touch screen, the corresponding operation (i.e., selection of a desired route, changing over the type of guidance input (voice and visual control or visual only), or screen characteristics such as scale) shown on the display unit/touch screen 12 is executed based on the inputted signal. The input signal generating means comprises this display of function buttons on the display unit/touch screen 12, but further detailed description is not given here.

The present position detecting unit 2 is provided with a GPS receiver 21 utilizing global positioning system. (GPS), a beacon receiver 22, a data transceiver for receiving compensation signal of GPS utilizing cellular phone (automobile phone) or FM multiplex signal 23, an absolute heading sensor 24 comprising a geomagnetic sensor, a relative heading sensor 25 comprising wheel sensor, steering sensor and gyro and a distance sensor 26 for detecting traveled distance from the number of revolutions of the wheels.

The information storage unit 3 is a data base where all necessary data for the navigation system are recorded. It comprises files such as map data, intersection data, node data, road data, photograph data, registered point data, guidance point data, destination data, telephone number data and address data.

The central processing unit 4 comprises a CPU 40 for executing various computation processing, a first ROM 41 for storing programs to execute processing such as route searching and programs for display output control necessary for route guidance and for audio output control necessary for audio guidance and necessary data, a RAM 42 for temporarily storing route guidance information such as coordinates and road number(s) of the preset destination or data under computation, a 2nd ROM 43 for storing display information data necessary for route guidance and map display, an image memory 44 for storing image data used for screen display on the display unit, an image processor 45 for picking up the image data from the image memory 44 based on the display output control signal from the CPU 40 and for outputting it to the display unit after image processing, an audio processor 46 for synthesizing voice, phrase, a sizable sentence and sound read from the information storage unit 3 based on the audio output control signal from the CPU for outputting them to the speaker 16 after converting to an analog signal, a communication interface 47 for sending and receiving input/output data, a sensor input interface 48 for incorporating sensor signal of the present position detecting unit 2, and a clock 49 for recording date and time to internal dialog information. In the central processing unit, route guidance is carried out by screen display and audio output, and the driver can select whether the data should he provided in audio output or not.

Figure 2:
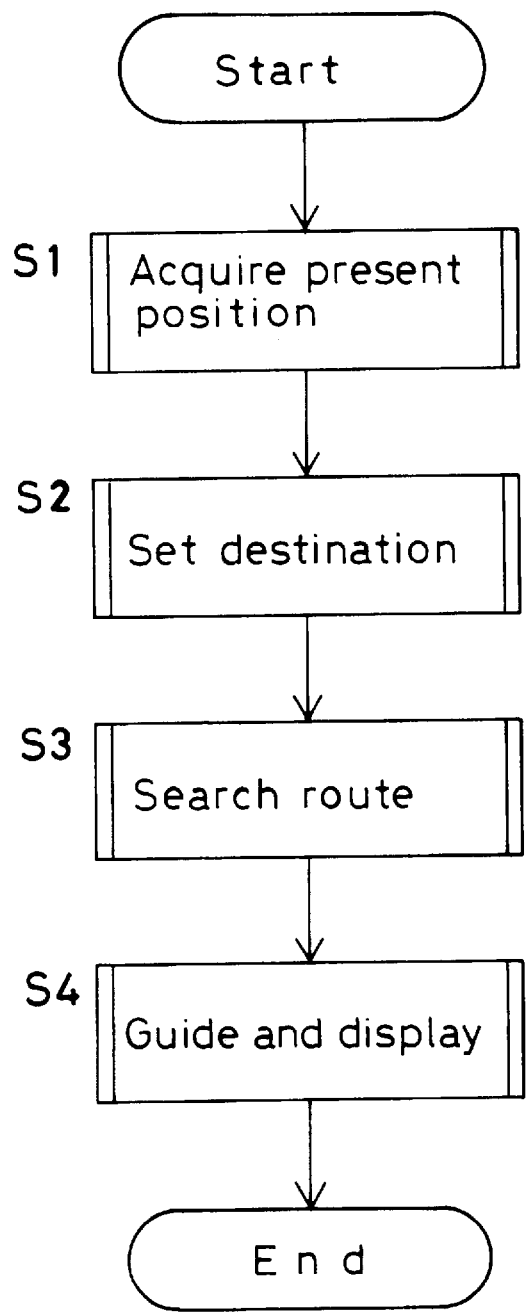
FIG. 2 is a flow chart of a flow of processing in the entire system.

FIG. 2 is a flow chart for explaining a flow of the entire navigation system of the present invention.

When the program of the route guidance system is started by CPU 41 of the central processing unit 4, the present position of the vehicle is detected by a present position detecting unit 2, and a map of the vicinity of the present position is displayed. Also, the name and other data of the present position are displayed (Step S1). Next, a destination is set using target name, telephone number, address or registered point of the place or the facility (Step S2). Then an optimal route from the present position to the destination is searched (Step S3). When the route has been determined, the present position is traced by the present position detecting unit 2, and route guidance and display are repeatedly performed until the vehicle reaches the destination (Step S4). When an additional route, out of the planned route, is set before the vehicle reaches the destination a search area is set. Then, re-searching is carried out in the search area and route guidance is repeated until the vehicle reaches the destination.

Next, description will be given on a case where the destination is inputted using a target name by alphabetical input.

FIG. 3 shows an alphabetical input screen. When the first character or the first letter "A" of the target name and the second character "B" are inputted, it is displayed on the screen that the subsequent characters and numerics following these two characters are limited to the characters and numerics "B, E, H, J, M, 0, R, U, Y, 3, 4, 5, 6 and 7" as shaded on the screen. At the same time, the number of the remaining lists is displayed as "1234." Here, if the column "LIST" on the screen is pressed, all registered names having the shaded characters "AB" as the first two characters are displayed on the screen. Thus, it is found that the characters "ABCDEFG" shaded on the screen represent the name of the target facility. When this is selected and inputted by key operation or by remote control operation, a map of the vicinity of the target facility is displayed on the screen. By key operation, it is also possible to return to the initial character input screen by reversing the above procedure, i.e. "map display screen" → "list display screen" → "character input screen". In case it is troublesome to search the aimed name on the display screen because there are a large number of remaining lists, the number of inputted characters should be increased. Then, the number of the remaining lists decreases. When the number of the remaining lists has decreased, the user can select the aimed target name from the displayed list on the screen. When the characters are inputted until there is only one list, the remaining name is selected and inputted automatically or by key operation, and a map of the vicinity of the aimed target is displayed. The characters can be inputted not only from the touch panel on the input screen hut may be inputted by voice if a voice input unit is provided.

As described above, when the target name is inputted, the number of the remaining lists of target names including the inputted characters and numerics is displayed each time a character is inputted. By watching the number of the remaining lists, it is possible to judge whether the number of the inputted characters should be increased or the list of target names should be displayed to select a name from the list. Thus, without inputting all of the characters of the target name, it is possible to select and input the aimed target name. This will eliminate much time and labor for inputting and extensively contribute to the convenience of the user.

FIG. 4 shows an example of a data structure of registered places for when the target name is inputted alphabetically. In this list, the registered names having the first character "B" and the second character "A" include the following names in all:

BADAPOZ, BADANAH, BAIKAL, BAQUBAH, BARCELONA, BARSTOW, BASEL, BASTAK, BASILAN, BATH, BATHURST, BAYERN

The registered names having the first character "B" and the second character "E" include the following names:

BEITBRIDGE, BELFAST, BERLIN, BERN, BERGEN, BERKLEY

Taking an example of a case where it is wanted to input "BARCELONA" as the target name, when the characters "BA" are inputted, the number of remaining target names in the list is displayed as "12". Further, when the characters "BAR" are inputted, the number of remaining target names in the list is "2". Here, if the column "LIST" on the screen is pressed, the names "BARCELONA" and "BARSTOW" are displayed on the list. When the name "BARCELONA" is selected, a map of its vicinity is displayed. In this case, if the characters "BARC" are inputted, the number of remaining target names is 1. Then, the name "BARCELONA" is selected, and a map of its vicinity is displayed. Therefore, there is no need to input the nine characters of "BARCELONA", and inputting of 3 or 4 characters will suffice.

Similarly, in case the target name is "BERLIN", when the characters "BE" or "BER" are inputted, the number of registered target names remaining in the list is "6". When the characters "BERL" are inputted, the number of registered target names remaining is 1. Then, the name "BERLIN" is selected, and a map of its vicinity is displayed. In this case again, the list key may be pressed when the number of the remaining lists is "6", and the name "BERLIN" may be selected from the list. In this case, there is no need to input 6 characters of "BERLIN", and inputting of 2 or 4 characters will suffice.

Figure 5:
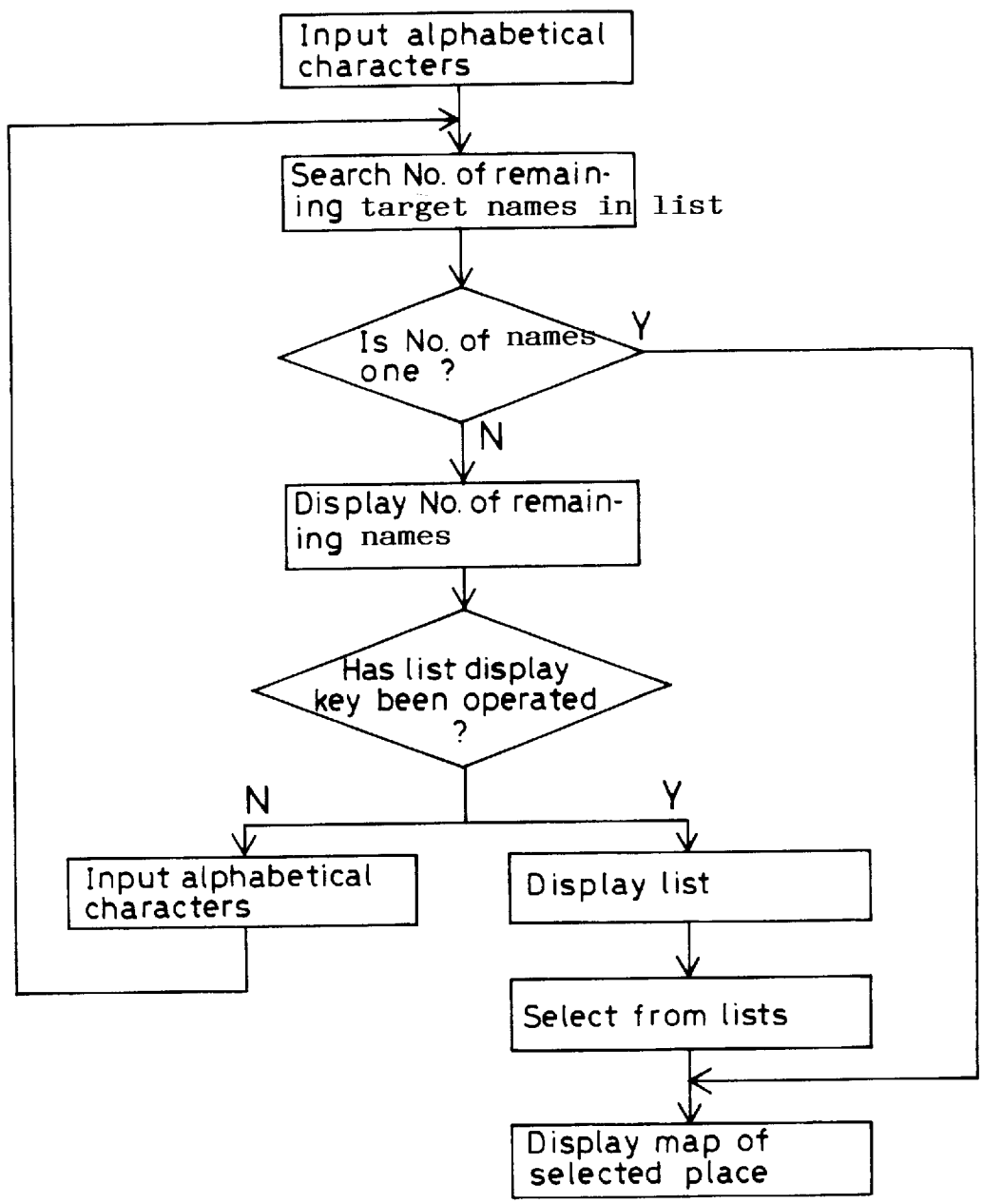
FIG. 5 is a flow chart of processing to display the number of target names remaining in the list.

FIG. 5 is a flow chart of processing to display the number of registered target names remaining in the list in alphabetical input. When characters or numerics are inputted on the alphabetical input screen, each time a character is inputted, the number of registered target names remaining in the list is searched. In case the number is more than 1, the number of registered target names remaining in the list is displayed on the screen. Then, it is judged whether the list display key has been operated or not, and it is determined whether the list display processing should be performed or input processing should be continued. If the list display key has not been operated, alphabetical input processing is carried out. If the list display key has been operated, list display is specified and all relevant names are displayed. When the target name is searched and selected from these names, a map of the vicinity of the selected point is displayed. In case the number of registered target names remaining is 1, the map of the vicinity of the selected point is displayed automatically or by key operation.

Figure 6:
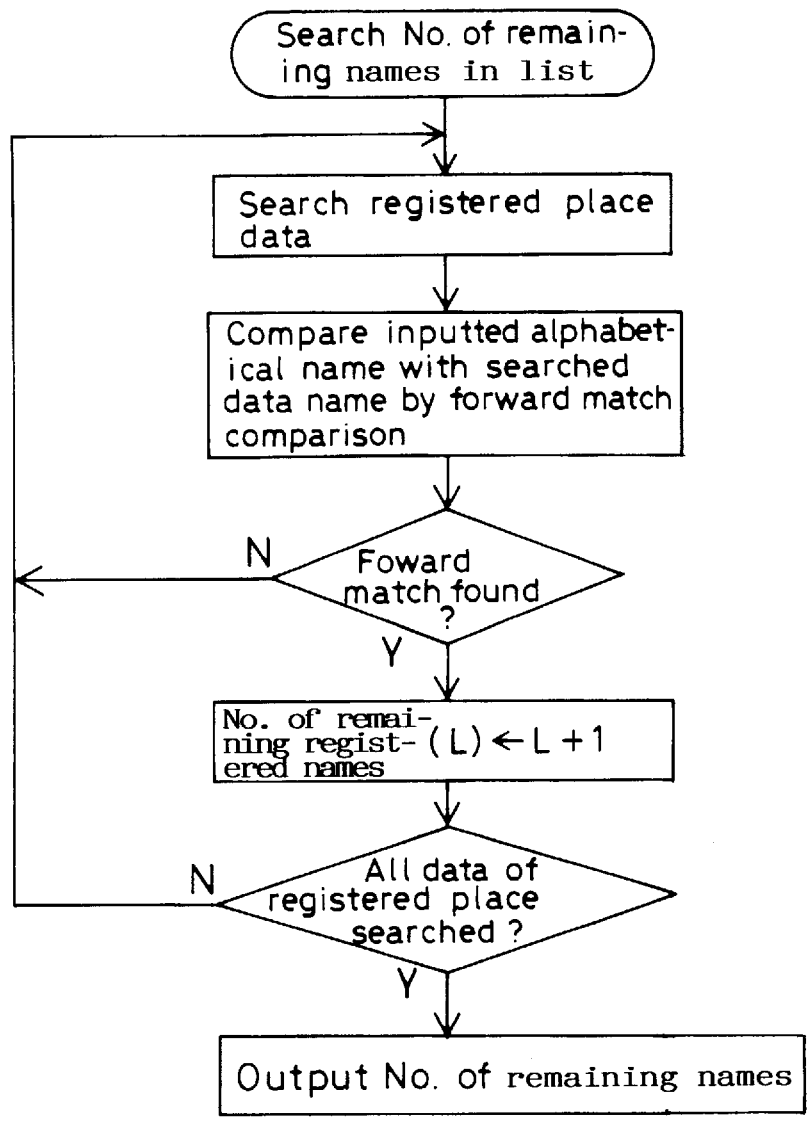
FIG. 6 is a flow chart of processing to search the number of target names remaining in the list.

FIG. 6 is a flow chart of processing to search the number of registered target names in the remaining list by forward match comparison on the data structure as shown in FIG. 4. When the characters are inputted, the registered place data is searched, and the name of alphabetical input is compared with the name in the searched data by forward match comparison. If the names do not match each other, the registered place data is further searched, and forward match comparison is carried out sequentially. If matched, the number of registered target names in the list (L) is increased only by one, and this processing is executed until all data is searched. When searching of all data has been completed, the number of registered target names in the list is outputted.

In case there are a great number of data, the registered place data file is divided as shown in FIG. 7 to an index data comprising name and place data address and size, and to a category-classified place data comprising place data name and its pronunciation (or name components), east longitude and north latitude, map display scale, and registered place number for each place data. The category-classified place data is pointed to by the place data address and size from the index data so that each place data name can be searched from the category name. Thus, the target name is inputted after selecting the category, and this makes it possible to decrease the number of the relevant data.

The above explanation has been based on searching for each word. In a foreign language, however, the name of destination is not necessarily made up by a single word. For example, the name "TOKYU HOTEL" is regarded as a single word in the Japanese language, while it is regarded as two words in English and other languages. Therefore, when the word "HOTEL" is inputted in searching, it is desirable to confirm whether there is a space before or after a component of the word and to search a place, which includes the word "HOTEL".

Description is now given on processing a search by partial match comparison for each word having a component or components separated by a space.

FIG. 8 shows an alphabetical input screen. When the word "HOTEL" is inputted, searching is performed by partial match comparison, and it is found that the characters and numerics separated by the space and combined with this word are limited to those shaded, i.e. "D, E, G, H, J, M, 0, R, U, Y, 3, 7". At the same time, the number of registered target names remaining in the list is displayed as "1234". When the column "LIST" on the screen is pressed, all registered names containing the word "HOTEL" are listed on the display. If the shaded name "A HOTEL" is the name of the destination and it is selected and inputted by key operation or by remote control operation, a map of its vicinity is displayed on the screen. It is also possible to reverse this procedure by key operation in the order of: "map display screen" → "list display screen" → "character input screen". In case the number of registered target names remaining in the list is too many and it is troublesome to search the aimed target name on the list displayed on the screen, the number of the inputted characters should be increased. Then, the number of registered target names remaining on the list decreases. When the number of registered target names remaining on the list has been reduced, the operator can see the list on the display and select the name of the destination. When the characters are inputted until the number of registered target names remaining on the list is one, the remaining name is selected and inputted automatically or by key operation, and a map of its vicinity is displayed on the screen.

FIG. 9 shows an example of data structure of the registered places containing words having components separated by a space. These are:

"A BANK", "A HOTEL", "A STATION", "BANK AA", "B BANK", "B HOTEL", "B STATION", "HOTEL D", "HOTEL E"

If this list includes all names containing the words "BANK", "HOTEL" and "STATION", when the word "BANK" is inputted, the number of registered target names remaining on the list is "3". When the word "HOTEL" is inputted, the number of registered target names remaining on the list is "4". When the word "STATION" is inputted, the number of the registered target names remaining on the list is displayed as "2" on the screen.

Figure 10:
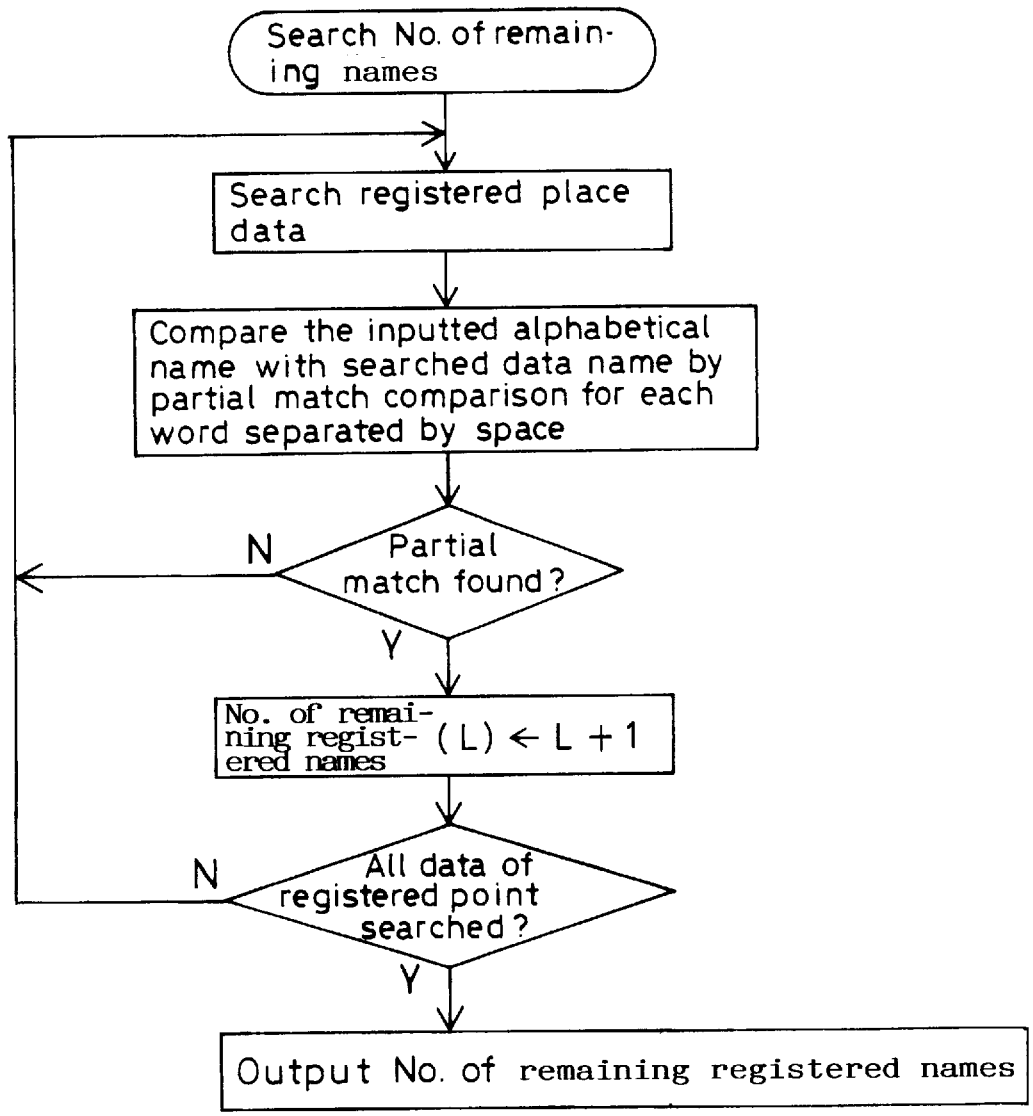
FIG. 10 is a flow chart of processing to search number of the remaining lists.

FIG. 10 is a flow chart of search processing the number of registered target names remaining on the list by partial match comparison of the data structure as shown in FIG. 9.

When a word is alphabetically inputted, the registered place data are searched, and partial match comparison is performed for each word, which has components separated by space, i.e. the alphabetically inputted name is compared with the names on the search data. If a partial match is not found, the registered place data is searched further, and partial match comparison is executed sequentially. If a partial match is found, the number of registered target names remaining on the list (L) is increased by one only, and the processing is carried out until all data is searched. When searching all data has been completed, the number of registered target names remaining on the list is outputted. In this way, the aimed target name partially containing inputted alphabetical characters separated by a space can be searched.

Moreover, a partial match search method can be done by searching the spaces, and by recognizing the alphabetical character next to the space as the first character, the word next to the spaces can be searched by forward match.

Next, description will be given on an example where the destination is inputted by a target name.

FIG. 11 shows an exemplary input screen using English phonetics of Japanese syllabary to show that other languages, depending on the nation where the product is used, can also be provided. When the first character "fu" and the second character "ji" of the target name are inputted, it is displayed that the subsequent characters and numerics are limited to the shaded characters: "i, u, ka, ki, ko, sa, so, te, na, ho, ya, yo, ri, and wa". At the same time, the number of registered target names remaining in the list is displayed as "1950". When the column "LIST" on the screen is pressed, all registered names having the first two characters "fuji" are listed on the display. If the name "Fuji Insatsu" as shaded on the screen is selected and inputted by key operation or by remote control operation as the name of the target place, a map of its vicinity is displayed on the screen. It is also possible to reverse the procedure by key operation: "map display screen" → "list display screen" → "list display screen" → "character input screen". In case it is troublesome to search the aimed name on the list display screen because there are too many registered target names remaining on the list, the number of the inputted characters should be increased. Then, the number of registered target names remaining on the list is decreased, and when there are not many registered target names remaining on the list, the target name should be selected from the list displayed. When the characters are inputted until the number registered target names remaining on the list is one, the remaining name is selected and inputted automatically or by key operation, and a map of its vicinity is displayed. The characters may be inputted not only from the touch panel of the input screen, but by voice in case a voice input unit is provided.

Explaining now by taking examples in names of golf links, there are 12 golf links having a name with the word "Chiba" in the first portion of the name: "Chiba Isumi Golf Club", "Chiba Country Club Baigo Courage", "Chiba Country Club Kawama Course", "Chiba Country Club Noda Course", "Chiba Green Park Country Club", "Chiba Kosaido Country Club", "Chiba Kokusai Country Club", "Chiba Shinnihon Golf Club", "Chiba Springs Country Club", "Chiba Central Golf Club", "Chiba Yomi-uri Country Club", and "Chiba Lakeside Country Club". The names of golf links usually have many characters and it takes considerable time to input. In this case, if golf links are selected by category-classified data, and the name "Chiba" is inputted, the number of registered target names remaining on the list is displayed as "12" because there are 12 golf links having the word "Chiba" in the first portion of the name. All these names are listed on the display, and the desired golf link name should be selected from them. If the number of the inputted characters increases, and the name "Chiba Yo" is inputted for example, the number of registered target names remaining on the list is one. Then, Chiba Yomiuri Country Club is selected, and a map of its vicinity is displayed. This makes it possible to eliminate the troublesome procedure to input all characters of the target name.

There are golf links, having the names with the word "Chiba" not in the first portion, but in the middle of the name, e.g. "Dai Chiba Country Club" and "Hon Chiba Country Club". It is desirable that these can be searched. In this case, if it is arranged that all golf links having the common word "Chiba" in the name can be listed, it is possible to select the target name without inputting all characters at least by selecting from the list displayed.

Next, description will be given on preparation of a list of names, by which it is possible to search names other than official names.

Figures 12, 13:
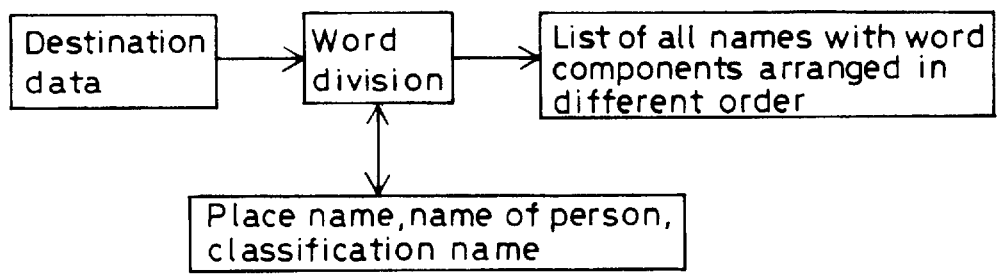
FIG. 12 is to explain preparation of a list of names.
FIG. 13 is to explain a list of names.

In the invention, as shown in FIG. 12, names of destination data are divided into component words, and it is determined whether place name, name of a person, classification name (school, city hall, station, park, hotel, etc.) are included in the divided words. For example, if it is already known that place name such as Tokyo or Ryogoku is included in the name, the name is divided as follows:

Tokyo Disneyland → "Tokyo" and "Disneyland"

Ryogoku Kokugikan → "Ryogoku" and "Kokugikan"

Next, supposing that searching can be achieved from the first portion of each of the divided name components, a list is prepared, containing all names, in which the order of the word components is changed, i.e., components of the name are aligned in different order. For example, two or more sequences of word components are registered for each Tokyo Disneyland as: Tokyo Disneyland Disneyland Tokyo Ryogoku Kokugikan as: Ryogoku Kokugikan Kokugikan Ryogoku and the list of the names is stored in CD-ROM. When an official name is stored in CD-ROM in two or more different word components arranged in different order, these are sorted according to the manner, in which the names are read. FIG. 13 shows an example of a list of names stored in CD-ROM in a manner described above.

As is evident from FIG. 13, to an official name "Ryogoku Rokugikan", two different types of word sequences are registered. For a proper name "Tokyo Disneyland", two different types of word sequences are registered. As a result, even when the names are inputted by the names other than the proper names such as "Kokugikan Ryogoku" or "Disneyland Tokyo", the places having the proper names of "Ryogoku Kokugikan" and "Tokyo Disneyland" can be searched. Further, the word components aligned in different orders are stored in CD-ROM as they are actually announced by a user, and it is possible to search by forward match at high speed. In the case number of the remaining names is displayed at the time of inputting, the number of names as registered in the list of names is displayed. Also, the pronunciation of the names in the list should be registered by excluding voiced constants in the list, e.g. the characters "ga" and "ka" are regarded as having the same pronunciation. In so doing, it is possible to reduce the number of inputted characters and number of the characters to be selected by the user.

When the target name is set, some of the inputted target name may contain a place name, a name of a person, a classification name. When this occurs, the place name, the name of a person, or the classification name may be excluded from the word components of the name. In the above examples, a list of names including the names "Kokugikan" and "Disneyland" and target name data can be prepared so that these can be searched by partial match. However, it is difficult to guarantee accuracy of word division, and also, it may take considerable time in searching. In contrast, it is possible according to the invention to guarantee accuracy of word division and to avoid waste of time in the searching on CD-ROM because the list of names is edited and turned to data in advance.

Figure 14:
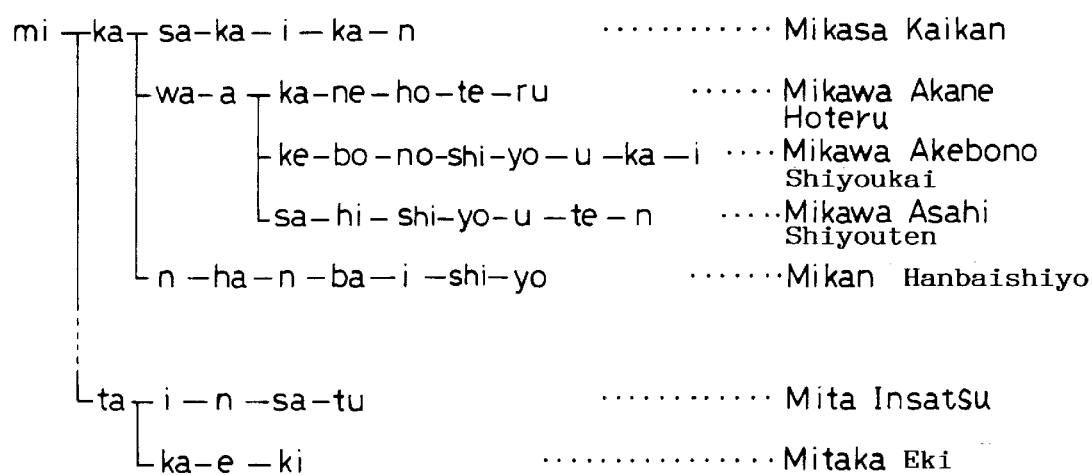
FIG. 14 is to explain a tree-type data structure.

FIG. 14 is a diagram of a tree-like data structure in case the target name is searched from the list of names by forward match comparison in Japanese. This is provided to show the flexibility of the system. In FIG. 14, English language phonetics of Japanese symbols are used.

In FIG. 14, it is assumed that the names having the first character "mi" are limited only to the name: "Mikasa Kaikan", "Mikawa Akarie Hoteru", "Mikawa Akebono Shiyoukai", "Mikawa Asahi Shiyouten", "Mikan Hanbaishiyo", "Mita Insatsu", and "Mitaka Eki". Here, it is supposed that the target name is "Mikawa Akane Hotel". When the character "mi" is inputted, the number of registered target names remaining on the list is displayed as "7", and it is displayed that the next character is "mi" or "ta". Then, when the characters "mika" are inputted, the number of registered target names remaining on the list is displayed as "5", and the next character is displayed as "sa", "wa" or "n". Further, when the characters "mikawa" are inputted, the number of registered target names remaining on the list is displayed as "3", and it is shown that the next character is "a". When the column "LIST" on the screen is pressed, all registered names having the first three characters "mikawa", i.e. the names "Mikawa Akane Hotel", "Mikawa Akebono Shokai", and "Mikawa Asahi Shoten", are displayed. By watching these names, the name "Mikawa Akane Hotel" can be selected. Further, when the characters "mikawa a" are inputted, the number of the remaining lists is displayed as "3", and it is displayed that the next character is "ka", "ke" or "sa". Further, when the characters "mikawa aka" are inputted, the number of the remaining lists is displayed as "1", and the remaining name is selected and inputted automatically or by key operation. Then, a map of its vicinity is displayed on the screen. In this way, the registered place data is inputted without inputting all characters of the registered name.

Figure 15:
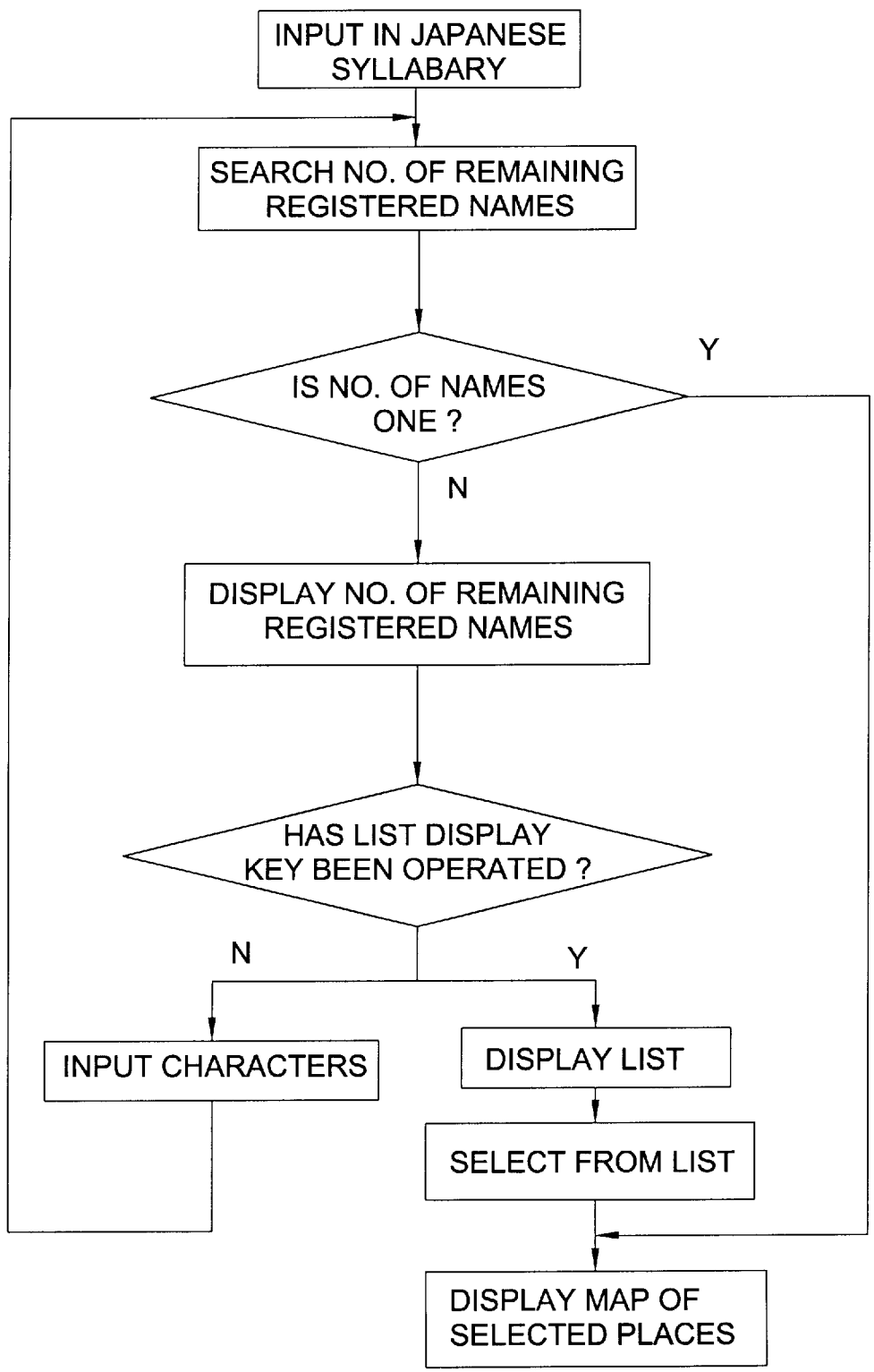
FIG. 15 is a flow chart of processing to display the number of target names remaining in the list.

FIG. 15 is a flow chart of processing to display the number of registered target names remaining on the list by Japanese character input. When the characters are inputted on the input screen, the number of registered target names remaining on the list is searched each time one character is inputted. If the number of registered target names remaining on the list is more than 1, the number of registered target names remaining on the list is displayed on the screen. Then, it is judged whether the list display key has been operated or not, and it is decided whether the list should be displayed or input processing should be continued. If the list display key has not been operated, input processing is performed. If the list display key has been operated, list display is specified Lo display all relevant names. When the target name is searched and selected from these names, a map of the vicinity of the selected place is displayed. When the number of the list is one, the map of the vicinity of the selected place is displayed automatically or by key operation.

Figure 16:
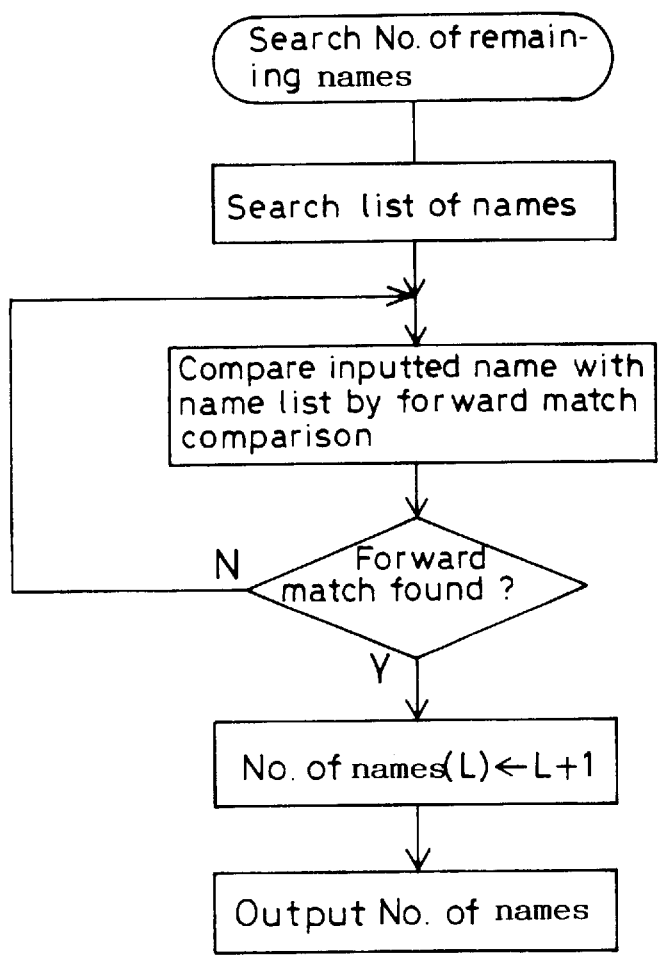
FIG. 16 is a flow chart of processing to search the number of target names remaining in the list.

FIG. 16 is a flow chart of processing to search the number registered target names remaining on the list by forward match comparison.

When characters are inputted, the list of names is searched, and the inputted characters are compared with the names in the list of names by forward match comparison. When a forward match is found, the number of registered target names remaining on the list (L) is increased by one only, and this processing is executed until all data is searched. When all data have been searched, the number of registered target names remaining on the list is outputted.

In the above embodiment, shown in FIG. 12 through 16, by dividing the proper name, such as Tokyo Disneyland, into specific components, changing the order of the components and registering both the different order and the proper name, even when the user inputs the different order of the name of the place he wants to go, the proper name of the place which the user wants to go is outputted and displayed as part of a list. Then, the user can choose the name from the list.

Furthermore, in the above embodiment, by dividing the proper name, such as Tokyo Disneyland, into specific components, changing the order of the components and registering both the different order and the proper name, even when the user inputs the different order of the name of the place he wants to go, the proper name of the place and the different order of the place may be outputted and displayed as part of a list. Then, the user can choose the name from the list.

As already explained, names having two or more different arrangements of word components can be registered with respect to a single official name. The target name can he searched from any of these, and the names other than the official names can be searched. Also, the list of names are sorted in the order of the reading of the names, i.e. in the arrangement order of word component of the names. Then, a forward match search can be executed at high speed, and it is possible to prevent low responsiveness. Because the number registered target names remaining on the list is displayed each time one character is inputted, it is possible to judge whether the number of inputted characters should be increased or the list of target names should be displayed and the target name should be selected from the displayed list by watching the number of registered target names remaining on the list. Accordingly, it is possible to select the target name without inputting all characters of the target name. This makes it possible to save considerable labor and time for inputting and to improve the convenience for the user.

What is claimed is:

1. A navigation system for vehicles for providing route guidance to a user to aid in determining an optimal route from the present position or from a starting point of a vehicle by inputting a target name of a destination, comprising:

input means for inputting characters or numerics of the target name sequentially;

memory means for storing at least data of registered places;

searching means for comparing inputted data with the data of the registered places stored in said memory means each time a character or numeric in the target name is inputted by said input means and for searching for target names including the characters or numerics input by the input means and a number of the target names;

list preparing means for preparing a list of registered places based on searching done by the searching means; and display means for displaying information to the user, wherein a number corresponding to the amount of registered places having target names including the characters or numerics of the target names as searched by said searching means based on the inputted data and on the prepared list is displayed by said display means, and when a number of registered places remaining on the list of registered places prepared by the list preparing means is decreased to a predetermined number the list is displayed by the display means so that the target name can be selected from the displayed list of registered places, the selected target name is set as the destination, and a map of the destination's vicinity is displayed.

2. The navigation system for vehicles according to claim 1, wherein, when the number of the registered places having the characters or numerics of the target name as inputted is one, said target name is set as the destination, and a map of the destinations vicinity is displayed.

3. The navigation system for vehicles according to claim 1, wherein input to the input means is alphabetical or numeric input, and said searching means searches the registered place data by comparing the inputted data with the registered place data by forward match comparison.

4. The navigation system for vehicles according to claim 3, wherein all alphabetical characters or numerics to be selected and inputted are displayed on a screen in a recognizable manner.

5. The navigation system for vehicles according to claim 2, wherein input to the input means is alphabetical or numeric input, and said searching means searches the registered place data by comparing the inputted data with the registered place data by forward match comparison.

6. The navigation system for vehicles according to claim 5, wherein all alphabetical characters or numerics to be selected and inputted are displayed on a screen in a recognizable manner.

7. The navigation system for vehicles according to claim 1, wherein a list of registered places that have the characters or numerics of the target name as inputted are displayed on the display means each time a character or numeric is inputted.

8. A navigation system for vehicles for providing route guidance to a user to aid in determining an optimal route from the present position or from a starting point of a vehicle by inputting a target name of a destination, comprising:

input means for inputting characters or numerics;

memory means for storing at least data of registered places;

searching means for searching for target names having the inputted characters or numerics and a number of target names by comparing inputted data with the data of the registered places stored in said memory means each time a character or numeric in the target name is inputted by said input means;

list preparing means for preparing a list of registered places based on searching done by the searching means; and display means for displaying information to the user, wherein a number corresponds to the amount of the registered places including target names having the characters or numerics of the target names searched by said searching means based on the inputted data is displayed the list of registered places prepared by the list preparing means is displayed on the display means when the number is decreased to a predetermined number so that the target name can be selected from the displayed list of registered places the selected target name is set to the destination, and a map of the destination's vicinity is displayed.

9. The navigation system for vehicles according to claim 8, wherein, when the number of registered names having characters or numerics of the inputted target name is one, the target name is set to the destination and a map of the destination's vicinity is displayed.

10. The navigation system for vehicles according to claim 8, wherein input to the input means is alphabetical or numeric, and said searching means searches the registered place data by comparing the inputted data with the registered place data by forward match comparison.

11. The navigation system for vehicles according to claim 10, wherein all alphabetical characters or numerics to be selected and inputted are displayed on a screen in a recognizable manner.

12. The navigation system for vehicles according to claim 9, wherein input to the input means is alphabetical or numeric, and said searching means searches the registered place data by comparing the inputted data with the registered place data by forward match comparison.

13. The navigation system for vehicles according to claim 12, wherein all alphabetical characters or numerics to be selected and inputted are displayed on a screen in a recognizable manner.

* * * * *